Figure 1:
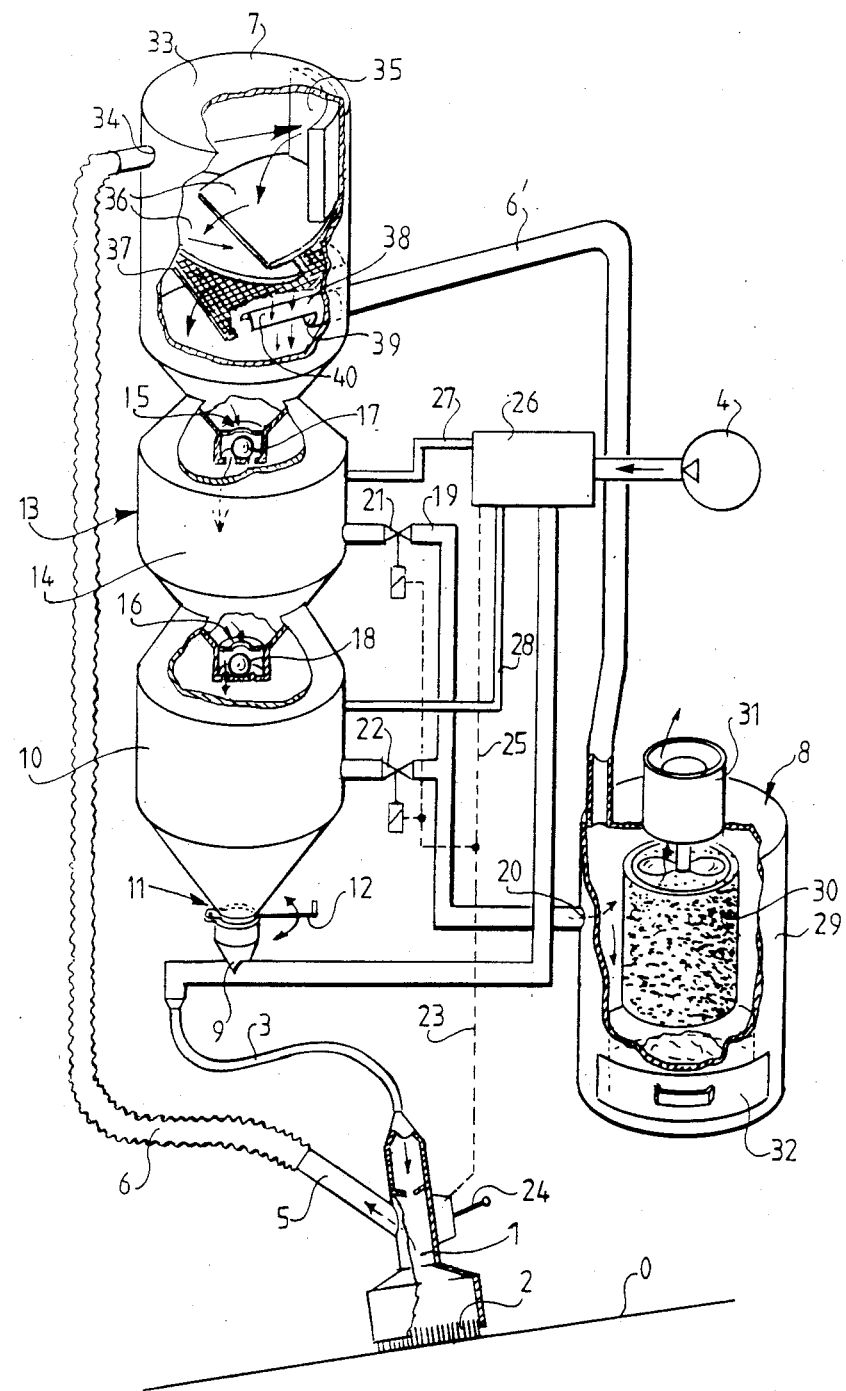

United States Patent [19]

Van Leeuwen

[11] Patent Number: 4,984,397
[45] Date of Patent: Jan. 15, 1991

[54] ABRASIVE BLASTING APPARATUS

[75] Inventor: Jacob K. L. Van Leeuwen, Oosterhout, Netherlands

[73] Assignee: LTC International B.V., Oosterhout, Netherlands

[21] Appl. No.: 348,174

[22] Filed: May 2, 1989

Related U.S. Application Data

[63] Continuation of Ser. No. 131,382, Dec. 9, 1987, abandoned.

[30] Foreign Application Priority Data

Dec. 9, 1986 [NL] Netherlands ............................ 8603134

[51] Int. Cl.⁵ ................................................ B24C 7/00
[52] U.S. Cl. .......................................... 51/425; 51/437
[58] Field of Search ................ 51/425, 424, 438, 437, 51/415–416, 410, 436

[56] References Cited

U.S. PATENT DOCUMENTS

| | | | |
|---|---|---|---|
| 2,455,514 | 12/1948 | Mead et al. | 51/425 |
| 2,597,434 | 5/1952 | Bishop et al. | 51/425 |
| 2,770,924 | 11/1956 | Mead et al. | 51/425 |
| 2,810,991 | 10/1957 | Mead et al. | 51/425 |

FOREIGN PATENT DOCUMENTS

| | | | |
|---|---|---|---|
| 0459086 | 10/1913 | France | 51/436 |
| 0079693 | 1/1919 | Switzerland | 51/438 |
| 0654400 | 3/1979 | U.S.S.R. | 51/424 |

Primary Examiner—Robert A. Rose

[57] ABSTRACT

A separating hopper for separating grit and dust feeds downwardly through a valve into a grit transfer hopper which feeds downwardly through a valve into a grit supply hopper. The grit supply hopper is connected to a blasting nozzle, and a return conduit extends from the nozzle to the separating hopper. A dust collector housing is connected to the separating hopper, and bleed conduits connect the dust collector housing to the interior of the grit supply hopper and grit transfer hopper. Controlled valves in the bleed conduits simultaneously open and close the connection between the dust collector housing and the grit supply hopper and grit transfer hopper. A compressed air source is connected by a control unit to the grit supply hopper and grit transfer hopper, and also to the blasting nozzle. The control unit as well as the controlled valves are controlled by a switch at the blasting nozzle.

8 Claims, 1 Drawing Sheet

ABRASIVE BLASTING APPARATUS

This application is a continuation of application Ser. No. 131,382, filed Dec. 9, 1987 now abandoned.

The invention relates to an apparatus for cleaning a surface by means of an abrasive in a transporting air current at high velocity, which apparatus substantially consists of a nozzle for placing on the surface provided with a feed line to be connected onto a pressure source, which line has an inlet opening for the abrasive, and a discharge line connected to a vacuum source and leading to a dust collector.

Apparatus of the type described in the preamble are often used for abrasive cleaning of arched surfaces, for example ship hulls, car body work, where a large removal capacity is required.

In order to increase the effective operating time the invention proposes that a dust/abrasive separator is accommodated in the discharge line and connected via a closable port mechanism with a storage tank for the reclaimed abrasive connected to the inlet opening, so that the abrading process can operate continuously, since the abrasive, for instance grit, is repeatedly transferred back in a cycle to the work-place. The dust on the other hand is carried via the dust separator to the dust collector. This particularly increases the efficiency of the apparatus.

In a preferred embodiment the port mechanism is an air tank which can be closed off by means of valves and which is connected via a line to the pressure source.

In a particularly simple embodiment the valves of the port mechanism are non-return valves acting under the influence of gravity, whereby the pressure tank and the storage tank are connected via a regulable bleed conduit onto the dust collector.

An especially robust, disturbance-free apparatus is hereby obtained.

In accordance with the invention the dust/abrasive separator is a container having baffle means arranged therein, whereby the discharge line leading to the dust collector runs out beneath the lowest of the baffle means.

The discharge line preferably protrudes into the container and is provided with an upward facing screening plate above its intake opening.

Finally, the lowest of the baffle means is preferably formed wholly or partially as a screening sieve.

The invention is further elucidated in the figure description of an embodiment following below.

The annexed FIG. 1 shows in schematic form an embodiment of the apparatus according to the invention.

Indicated in the figure with the numeral 1 is the blast nozzle which has to be moved manually or in another manner over a surface 0 for blasting. Blast nozzle 1 consists here of a housing provided with a brush 2 resting on surface 0, and is connected on the housing to a feed line 3 which is supplied by a pressure source 4 with compressed air. Housing 1 is in addition provided with a connecting stump 5 onto which is connected a flexible suction hose 6 which leads via a dust separator 7 to be further explained below to a dust collector also to be described hereinafter.

The conduit 3 is provided with an inlet opening 9 on which is arranged a storage hopper 10 for the abrasive material, for example grit of any random type. This hopper 10 is formed with a dosage mechanism 11 which can be adjusted manually or otherwise. This mechanism is provided with a handle 12 for this purpose.

Located between dust separator 7 and storage tank 10 is a port mechanism 13 consisting of a pressure tank 14 communicating with dust separator 7 via passage opening 15, and communicating with storage tank 10 via passage opening 16. Each of the openings 15 and 16 can be closed by means of a valve 17 and 18 respectively counter to the action of gravity.

Both the pressure tank 13 and storage tank 10 are connected via a rapid bleed conduit 19 to an inlet opening 20 of the dust collector 8. Arranged between each tank and the conduit 19 are shut-off valves 21 and 22 respectively which are controlled by a line 23 which transmits a signal from a handle 24 at the blast nozzle. Line 23 is also connected via a branch line 25 to a control unit 26 which is accommodated in the pressure feed conduit 3 as shut-off valve as well as ensuring the connection with the pressure source 4 to pressure tank 13 and storage hopper 10 via conduits 27 and 28 respectively.

The dust collector 8 consists of a housing 29 of sufficiently large volume in which is suspended a dust filter 30. Suspended inside dust filter 30 is a fan motor 31 which can draw off the air present in container 29.

The conduit 6' leads to a position in housing 29 outside the dust filter 30 as do the return pipes 19 of pressure tank 13 and storage tank 10.

Located at the bottom of housing 29 is a drawer 32 for collecting the separated dust.

The dust separator 7 consists of a housing 33 of likewise suitable volume, into the upper portion of which conduit 6 runs out. Arranged directly opposite the debouchment 34 is a resilient reflecting plate 35 of, for example, rubber. Fitted zig-zag-wise above one another beneath reflecting plate 35 are baffle plates 36 as well as a screening sieve plate 37. Placed underneath screening sieve plate 37 is a discharge stump 38 which has an inlet 39 protected by an overhanging plate portion 40.

The above described apparatus operates as follows.

The starting point is the position that the control unit 26 places the conduit 3 in communication with the pressure source 4 so that a determined volume flow of air at a determined pressure is created in conduit 3. The abrasive medium runs out of the storage tank 10 in doses via opening 11 into conduit 3 and arrives with the air current at the blast nozzle 1. As a result of the blasting nozzle present in housing 1 the air current with the abrading medium reaches a determined speed and is impelled against the surface 0 and creates as a result a determined abrading action which will clean the surface 0. In the housing'g 1 a vacuum is generated which discharges the quantity of air with grit and dust via stump 5 and conduit 6. This mixture is carried at a determined speed into the dust separator 7, whereby the grit and dust are impelled against the plate 35 which because of its elastic function prevents excessive wear of the inner wall of the tank. The impact action that is nevertheless present causes a separation between dust and grit particles which then sink downward over the baffle plates 36 in zig-zag fashion whereby the screen 37 sieves out the grit particles as a result of their higher specific weight to the lower part of tank 7. The dust particles are discharged at low speed with the air via pipe 6 to the dust collector 8. The intake opening 39 is protected by the guard 38 against the downward falling grit so that carrying away of the grit with the discharge air flow via pipe 6' occurs hardly or not at all. In dust collector 8 the dust will sink downward into the tray 32, while the air is filtered via filter 30 and discharged by fan 31. The dust can be disposed of regularly via the removable drawer 32.

The reclaimed grit particles in tank 7 can fall via opening 15 into pressure tank 13 since the valve 17 is located in the lowest position under the influence of gravity. Assumed here is that initially atmospheric pressure prevails in tank 13 and that subsequently the vacuum from pipe 6' is present in this tank. After a time the conduit 27, under the control of control unit 26, is placed under pressure from the pressure source 4, whereupon tank 13 receives this pressure, which immediately pushes valve 17 upward so that opening 15 is closed off.

Because of the pressure in conduit 3 the pressure from pressure source 10 already prevails in storage tank 10 so that valve 18 keeps the opening 16 closed in the operating position. This pressure is applied more rapidly to hopper 10 via conduit 28 which is placed in direct communication with pressure source 4 by control unit 26. The reclaimed grit remains for the time being in pressure tank 13.

As soon as an operative reverses the switch 24 at the blast nozzle the control unit 26 is regulated such that conduit 3 is closed off from pressure source 4 and blast nozzle 1 is rendered inoperative. In this situation the valves 21 and 22 in the bleed conduit 19 are also opened and the pressure present in tanks 10 and 13 is immediately decreased. the respective valves 17 and 18 consequently drop downward under the influence of gravity and open the passage openings 15 and 16, as a result of which the grit can drop into the storage tank 10. When pressure is once again fed into conduit 3 the control unit 26 is regulated such that conduits 27 and 28 are again placed under pressure and therefore also the tanks 10 and 13, which results in valves 17 and 18 returning to the closed position.

It will be apparent from the above that opening and closing of valves 17 and 18 takes place each time the blast nozzle 1 is turned on and off respectively, which will occur regularly. This ensures that the storage tank 10 always remains provided with sufficient grit material, this material being carried in a cycle via dust separator 7. Loss of grit material is consequently reduced to a minimum and only as a result of wear and the resulting dust forming will the grit material diminish. This grit that has been reduced to dust is carried away normally with the other dust to the dust collector 8.

The invention is not restricted to the above described embodiment. So for example the system of valves 17 and 18 can be replaced by any other random valve, for instance electro-magnetic or pneumatic types. In this latter case the pressure tank 13 could be omitted and the dust collector connected directly to the storage hopper 10.

The dust collector 8 can of course take any random suitable form.

I claim:

1. An abrasive blasting apparatus comprising the combination of a blasting nozzle including operator-controlled switching means for periodically controlling the apparatus, a grit supply hopper, a hopper for separating grit and dust and a grit tranfer hopper, all disposed in a stack with the hopper for separating grit and dust uppermost, the grit supply hopper lowermost and the grit transfer hopper in intermediate position, the lower end the grit supply hopper being in communication with the nozzle, a dust collector comprising a housing containing air-withdrawal means for maintaining the interior of the housing under partial vacuum, a dust discharge conduit leading from the hopper for separating grit and dust to the dust collector, bleed conduit means for connecting the interior of the dust collector housing to the interiors of the grit supply hopper and the grit transfer hopper, the bleed conduit means including controlled valve means for simultaneously opening and closing the connections to the interiors of the grit transfer hopper and the grit supply hopper, first valve means connecting the grit transfer hopper to the grit supply hopper for selectively dumping grit from the grit transfer hopper to the grit supply hopper when the interiors of such hoppers are connected to the interior of said dust collector housing and preventing flow of grit from the grit transfer hopper to the grit supply hopper when the interiors of such hoppers are connected to a compressed air source, second valve means connecting the hopper for separating grit and dust to the grit transfer hopper for selectively dumping grit from the hopper for separating grit and dust into the grit transfer hopper when the interior of the grit transfer hopper is connected to the interior of the dust collector housing, a compressed air source, a control unit controlled by the switching means and connected to the compressed air source, the grit supply hopper and the grit transfer hopper, said controlled valve means also being controlled by said switching means so that operation of said switching means selectively controls the controlled valve means to closed condition while compressed air is supplied simultaneously to the nozzle, the interior of the grit supply hopper and the interior of the grit transfer hopper and operation of said switching means disconnects the source from the nozzle, the interior of the grit supply hopper and the interior of the grit transfer hopper while the controlled valve means is actuated to open condition, and a grit and dust return conduit extending from the nozzle to the interior of the hopper for separating grit and dust.

2. Apparatus as defined in claim 1 wherein the hopper for separating grit and dust comprises a container having baffle means therein and the dust discharge conduit including an end portion extending into the hopper for separating grit and dust and being disposed below the lowest baffle of the baffle means.

3. Apparatus as defined in claim 2 wherein the end portion terminates in an upwardly facing screening plate above its discharge opening.

4. Apparatus as defined in claim 3 wherein the lowest baffle of the baffle means is in the form of a screening sieve which does not pass grit.

5. Apparatus as defined in claim 2 wherein the grit and dust return conduit discharges grit and dust into the container at one side thereof and the opposite side of the container including a resilient liner against which the grit and dust impinges.

6. An abrasive blasting apparatus comprising the combination of a blasting nozzle including operator-controlled switching means for periodically controlling the apparatus, a grit supply hopper, a grit transfer hopper and a hopper for separating grit and dust all disposed in upward sequence as a stack to that gift may cascade downwardly through the stack into the grit supply hopper and thence into the nozzle, the lower end of the grit supply hopper being in communication with the nozzle, a dust collector comprising a housing containing air-withdrawal means for maintaining the interior of the housing under partial vacuum, a dust discharge conduit leading from the hopper for separating grit and dust to the dust collector, bleed conduit means for connecting the interiors of the grit supply hopper and the grit transfer hopper to the interior of the housing, the bleed conduit means including controlled valve means for simultaneously and selectively connecting and closing the interiors of the grit transfer hopper and the grit supply hopper to the interior of the dust collector housing, valve means for isolating the interior of the transfer hopper from the interiors of the hopper for separating grit and dust and the grit supply hopper, a compressed air source, control unit means connected to the compressed air source, the grit supply hopper and the grit transfer hopper, said switching means controlling operation of said controlled valve means and said control unit means for selectively controlling the control valve means to closed condition so that the interiors of the transfer and supply hoppers are not connected to the interior of the housing while supplying compressed air simultaneously to the nozzle, the interior of the grit supply hopper and the interior of the grit transfer hopper, and so that the interiors of the transfer and supply hoppers are connected to the interior of the housing while disconnecting the source from the nozzle, the interior of the grit supply hopper and the interior of the grit transfer hopper.

7. Apparatus as defined in claim 6 including a grit and dust return conduit leading from the nozzle to the hopper for separating grit and dust and wherein the grit/dust separator hopper comprises a housing having a resilient liner in its upper portion against which returned grit and dust impinges, and including baffle means below the liner, the dust discharge conduit including an inlet end portion within the housing below the baffle means presenting an inlet opening and an overhanging protective deflector portion.

8. Apparatus as defined in claim 7 wherein the baffle means includes a lower sieving screen sized to pass dust but not grit.

* * * * *